(12) United States Patent
Iisaka

(10) Patent No.: US 7,646,462 B2
(45) Date of Patent: Jan. 12, 2010

(54) LIQUID CRYSTAL DEVICE AND PROJECTOR

(75) Inventor: Hidehito Iisaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 312 days.

(21) Appl. No.: 11/532,792

(22) Filed: Sep. 18, 2006

(65) Prior Publication Data

US 2007/0109248 A1    May 17, 2007

(30) Foreign Application Priority Data

Nov. 16, 2005    (JP) ............................. 2005-331100

(51) Int. Cl.
    *G02F 1/1343* (2006.01)
(52) U.S. Cl. ....................................... 349/139; 349/43
(58) Field of Classification Search ................. 349/139, 349/43
    See application file for complete search history.

(56) References Cited

U.S. PATENT DOCUMENTS

| | | | | |
|---|---|---|---|---|
| 5,337,173 | A * | 8/1994 | Atsumi et al. ................. | 349/39 |
| 5,614,427 | A * | 3/1997 | den Boer et al. .............. | 438/30 |
| 6,100,948 | A * | 8/2000 | Kim et al. ..................... | 349/39 |
| 6,521,913 | B1 * | 2/2003 | Murade ........................ | 257/59 |
| 6,724,450 | B1 | 4/2004 | Knoll et al. | |
| 6,770,909 | B2 * | 8/2004 | Murade ........................ | 257/59 |
| 6,872,975 | B2 * | 3/2005 | Murade ........................ | 257/59 |
| 6,882,375 | B2 * | 4/2005 | Kim ............................. | 349/43 |
| 6,888,589 | B2 * | 5/2005 | Kim et al. ..................... | 349/54 |
| 7,091,966 | B2 | 8/2006 | Aoki et al. | |
| 7,256,759 | B2 * | 8/2007 | Kim et al. ..................... | 345/87 |
| 2001/0015715 | A1 | 8/2001 | Hebiguchi et al. | |
| 2003/0122125 | A1 * | 7/2003 | Murade ........................ | 257/59 |
| 2003/0122157 | A1 * | 7/2003 | Murade ........................ | 257/200 |
| 2003/0122158 | A1 * | 7/2003 | Murade ........................ | 257/200 |
| 2004/0001176 | A1 * | 1/2004 | Kim et al. ..................... | 349/139 |
| 2005/0168666 | A1 * | 8/2005 | Kawasaki ..................... | 349/43 |
| 2005/0242351 | A1 * | 11/2005 | Kim ............................. | 257/59 |
| 2005/0280747 | A1 * | 12/2005 | Nakayoshi et al. ............ | 349/38 |
| 2006/0187371 | A1 * | 8/2006 | Nakayoshi et al. ............ | 349/38 |
| 2008/0035919 | A1 * | 2/2008 | Shin et al. .................... | 257/40 |

FOREIGN PATENT DOCUMENTS

| | | |
|---|---|---|
| JP | A-02-264224 | 10/1990 |
| JP | A-03-033724 | 2/1991 |

(Continued)

*Primary Examiner*—K. Cyrus Kianni
(74) *Attorney, Agent, or Firm*—Oliff & Berridge, PLC

(57) ABSTRACT

A liquid crystal device includes a pair of substrates between which liquid crystal is sandwiched, a plurality of pixel electrodes arranged in a matrix on one of the substrates, switching elements that control the supply of current to the pixel electrodes, scanning lines that supply scanning signals to the switching elements, and data lines that cross the scanning lines and that supply image signals to the switching elements. The pixel electrodes are arranged in pairs, and each pair of the pixel electrodes are adjacent in an extending direction of the data lines and are disposed between a corresponding pair of the scanning lines in the extending direction of the data lines. The switching elements corresponding to each line of the pixel electrodes arrayed in the extending direction of the data lines are alternately connected to either of opposing sides of an adjacent pair of the data lines in the extending direction of the data lines.

2 Claims, 15 Drawing Sheets

FOREIGN PATENT DOCUMENTS

| | | |
|---|---|---|
| JP | A 11-95235 | 4/1999 |
| JP | A-2001-021892 | 1/2001 |
| JP | A 2001-33820 | 2/2001 |
| KR | 1020010058190 * | 5/2001 |
| KR | A 2001-0058190 | 7/2001 |
| KR | A 2002-0010209 | 2/2002 |
| KR | A 10-2004-0007304 | 1/2004 |
| KR | A 10-2006-0119399 | 11/2006 |

* cited by examiner

LIQUID CRYSTAL DEVICE AND PROJECTOR

BACKGROUND

1. Technical Field

The present invention relates to a liquid crystal device and a projector.

2. Related Art

Projection display apparatuses, such as projectors, are used widely. A projector includes a splitting optical system for splitting light-source light into different color light components, a light modulator for obtaining color image light components by modulating the split color light components, a prism for producing a color image by combining the color image light components, and a projection lens for enlarging and projecting the color image onto a screen. As the light modulator, a liquid crystal light valve having a liquid crystal device is adopted.

In a liquid crystal device, liquid crystal is sandwiched between a pair of substrates. One of the substrates includes a plurality of pixel electrodes arranged in a matrix, switching elements for controlling the supply of current to the pixel electrodes, scanning lines for supplying scanning signals to the switching elements, and data lines crossing the scanning lines such as to supply image signals to the switching elements. The other substrate includes a common electrode. By applying the voltage between the common electrode and the pixel electrodes, the liquid crystal is driven, and the transmittance for incident light is changed in each pixel. Image light corresponding to each color is thereby obtained (for example, see JP-A-11-95235).

In the above-described liquid crystal device, regions where the pixel electrodes are provided serve as apertures, and regions where the scanning lines, the data lines, and the switching elements are provided around the pixel electrodes serve as non-aperture regions that do not transmit light. Since the size of the non-aperture regions is significant for the wavelength of light, light diffraction occurs at the ends of the apertures. In particular, when the pixel size is small (e.g., 6 μm or less), a quite high proportion of transmitted light is influenced by diffraction. In the projection display device, when the optical path of light is bent by the influence of diffraction, the light is not received by the projection lens, and an obtained image is markedly dark.

SUMMARY

An advantage of the invention is that it provides a liquid crystal device and a projector that can improve the display quality by reducing the influence of diffraction.

A liquid crystal device according to a first aspect of the invention includes a pair of substrates between which liquid crystal is sandwiched; a plurality of pixel electrodes arranged in a matrix on one of the substrates; switching elements that control the supply of current to the pixel electrodes; scanning lines that supply scanning signals to the switching elements; and data lines that cross the scanning lines and that supply image signals to the switching elements. The pixel electrodes are arranged in pairs, and each pair of the pixel electrodes are adjacent in an extending direction of the data lines and are disposed between a corresponding pair of the scanning lines in the extending direction of the data lines. The switching elements corresponding to each line of the pixel electrodes arranged in the extending direction of the data lines are alternately connected to either of opposing sides of an adjacent pair of the data lines in the extending direction of the data lines.

In this case, since an aperture is formed by a pair of pixel electrodes, the area of the aperture can be increased.

In the liquid crystal device disclosed in the above-described publication JP-A-11-95235, as shown in FIG. 7, a plurality of switching elements 31, 32, and 33 are arranged in line in the extending direction of a data line 61. Therefore, the switching elements 32 and 33 are arranged in series between adjacent scanning lines 72 and 73.

In contrast, in this aspect of the invention, a plurality of switching elements are alternately connected to one of the adjacent data lines and the other data line in the extending direction of the data lines. Therefore, the switching elements can be arranged in parallel between the adjacent scanning lines. As a result, the area of the non-aperture region is reduced (for example, the width of the non-aperture region can be reduced by an amount almost equal to the width of the switching elements), and the aperture ratio is increased. This can reduce the influence of diffraction.

A liquid crystal device according to a second aspect of the invention includes a pair of substrates between which liquid crystal is sandwiched; a plurality of pixel electrodes arranged in a matrix on one of the substrates; switching elements that control the supply of current to the pixel electrodes; scanning lines that supply scanning signals to the switching elements; and data lines that cross the scanning lines and that supply image signals to the switching elements. The pixel electrodes are arranged in pairs, and each pair of the pixel electrodes are adjacent in an extending direction of the data lines and are disposed between a corresponding pair of the scanning lines in the extending direction of the data lines. A shielding film is disposed between the adjacent pixel electrodes so as to cover a region where the pixel electrodes are not provided.

In this case, light leakage in the no-pixel-electrode region can be prevented, and the display quality of the liquid crystal device can be improved.

A liquid crystal device according to a third aspect of the invention includes a pair of substrates between which liquid crystal is sandwiched; a plurality of pixel electrodes arranged in a matrix on one of the substrates; switching elements that control the supply of current to the pixel electrodes; scanning lines that supply scanning signals to the switching elements; and data lines that cross the scanning lines and that supply image signals to the switching elements. The pixel electrodes are arranged in pairs, and each pair of the pixel electrodes are adjacent in an extending direction of the data lines and are disposed between a corresponding pair of the scanning lines in the extending direction of the data lines. The scanning lines include a plurality of scanning lines that are stacked such as to coincide with each other in plan view.

The plan view is referred to as viewing from the normal direction of the substrates.

In this case, the area of the non-aperture region can be substantially reduced, and the aperture ratio can be increased. Therefore, the influence of diffraction is reduced.

A liquid crystal device according to a fourth aspect of the invention includes a pair of substrates between which liquid crystal is sandwiched; a plurality of pixel electrodes arranged in a matrix on one of the substrates; switching elements that control the supply of current to the pixel electrodes; scanning lines that supply scanning signals to the switching elements; and data lines that cross the scanning lines and that supply image signals to the switching elements. The pixel electrodes are arranged in first pairs and second pairs. Each first pair of the pixel electrodes are adjacent in an extending direction of the data lines and are disposed between a corresponding pair of the scanning lines in the extending direction of the data lines, and each second pair of the pixel electrodes are adjacent in an extending direction of the scanning lines and are disposed between a corresponding pair of the data lines in the extending direction of the scanning lines.

In this case, since each aperture is formed by a plurality of pixel electrodes, the area of the aperture can be increased. Therefore, the influence of diffraction is reduced.

Preferably, the pixel electrodes include a plurality of adjacent data lines to which the image signals are substantially simultaneously supplied.

In this case, an electrical interference between the adjacent data lines can be prevented.

A projector according to a fifth aspect of the invention performs light modulation with the above-described liquid crystal device.

Since this projector includes the liquid crystal device that can reduce the influence of diffraction, most image light can enter the projection lens. Therefore, the brightness and display quality of the projector can be improved.

A projector according to a sixth aspect of the invention performs light modulation with the liquid crystal device according the above-described liquid crystal device. The liquid crystal device includes a first liquid crystal device for modulating first color light and a second liquid crystal device for modulating second color light. A first scanning line in the first liquid crystal device and a second scanning line in the second liquid crystal device are shifted from each other on a projection plane of the projector in the extending direction of the data lines by a distance almost equal to a length of the pixel electrodes in the extending direction of the data lines when an image emitted from the first liquid crystal device and an image emitted from the second liquid crystal device are superimposed on the projection plane.

In this case, a shielded portion can be provided around each pixel on the display image. As a result, normal image display (particularly, text display) can be achieved.

A projector according to a seventh aspect of the invention performs light modulation with the above-described liquid crystal device. The liquid crystal device includes a first liquid crystal device for modulating first color light and a second liquid crystal device for modulating second color light. When an image emitted from the first liquid crystal device and an image emitted from the second liquid crystal device are superimposed on a projection plane of the projector, a first scanning line in the first liquid crystal device and a second scanning line in the second liquid crystal device are shifted from each other on the projection plane in the extending direction of the data lines by a distance almost equal to a length of the pixel electrodes in the extending direction of the data lines, and a first data line in the first liquid crystal device and a second data line in the second liquid crystal device are shifted from each other on the projection plane in the extending direction of the scanning lines by a distance almost equal to a length of the pixel electrode in the extending direction of the scanning lines.

In this case, a shielded portion can be provided around each pixel on the display image. As a result, normal image display (particularly, text display) can be achieved.

Preferably, the first color light is green light, and the second color light is red light or blue light.

In this case, the brightness of the shielded portion formed on the display image by a non-aperture region of the first liquid crystal device can be equal to the brightness of the shielded portion formed on the display image by a non-aperture region of the second liquid crystal device. As a result, normal image display is achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
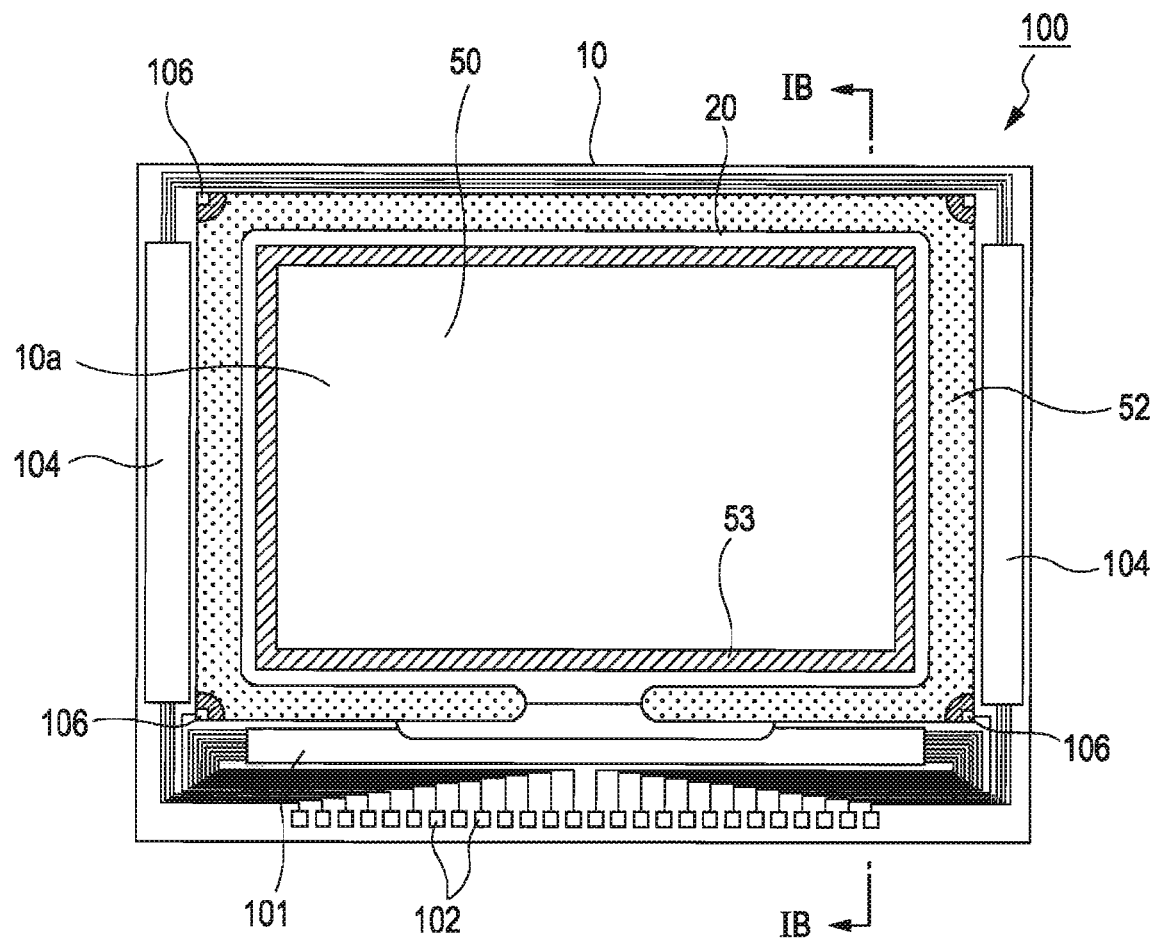
FIGS. 1A and 1B are schematic structural views of a liquid crystal device.

Embodiments of the invention will be described below with reference to the attached drawings. The scales of components are appropriately altered in the drawings so that the components are shown in sizes such as to be recognized. In this specification, a side of each component of a liquid crystal device closer to liquid crystal is referred to as an inner side, and a side opposite the inner side is referred to as an outer side. Further, "a nonselective voltage application time" means the time when the voltage applied to the liquid crystal is close to a threshold voltage, and "a selective voltage application time" means the time when the voltage applied to the liquid crystal is sufficiently higher than the threshold value.

Liquid Crystal Device

First, a liquid crystal device will be described.

Figure 1B:
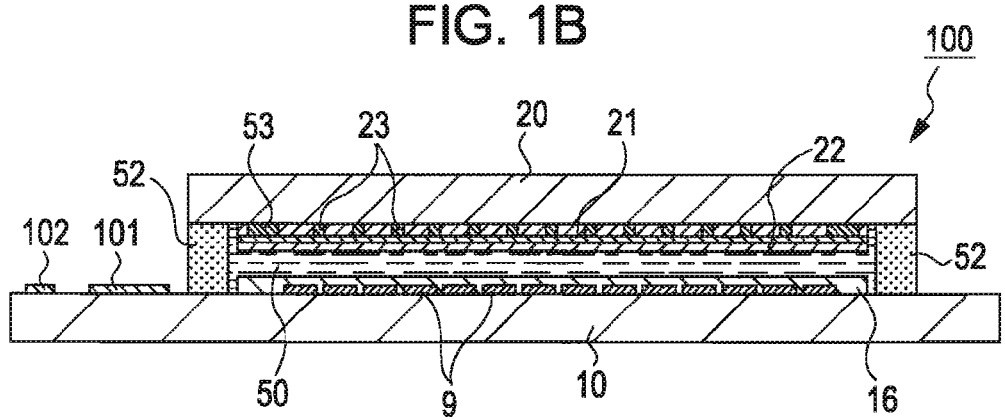

FIG. 1A is a plan view of a liquid crystal device and its components, as viewed from the side of a counter substrate, and FIG. 1B is a sectional side view, taken along line IB-IB in FIG. 1A. As shown in FIG. 1B, a liquid crystal device 100 includes a TFT array substrate (hereinafter referred to as an element substrate) 10 and a counter substrate 20 between which liquid crystal 50 is sandwiched, and a plurality of pixel electrodes 9 arranged in a matrix on the element substrate 10.

In the liquid crystal device 100, the element substrate 10 and the counter substrate 20 are bonded with a sealing material 52, and the liquid crystal 50 is sealed in an optical modulation region 10a defined by the sealing material 52, as shown in FIGS. 1A and 1B. An image-signal driving circuit 101 and external-circuit mounting terminals 102 are provided along one side of the element substrate 10 in a peripheral circuit region outside the sealing material 52. Scanning-signal driving circuits 104 are respectively provided along two sides adjoining the one side. Conductive materials 106 are provided at the corners of the counter substrate 20 so as to ensure electrical continuity between the element substrate 10 and the counter substrate 20.

Equivalent Circuit

Figure 2:
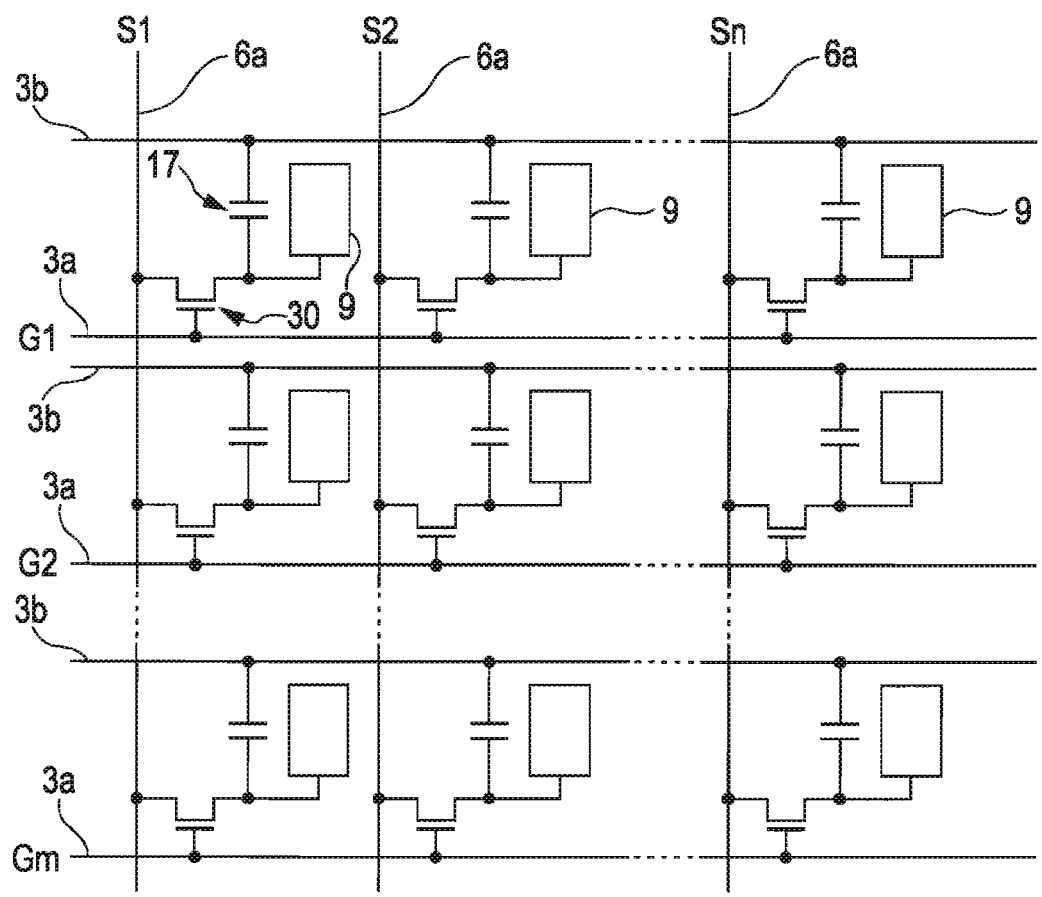
FIG. 2 is an equivalent circuit diagram of the liquid crystal device.

FIG. 2 is an equivalent circuit diagram of the liquid crystal device 100. The liquid crystal device 100 includes a plurality of pixel electrodes 9, TFT elements 30 for controlling the supply of current to the pixel electrodes 9, scanning lines 3a for supplying scanning signals to the TFT elements 30, and data lines 6a intersecting the scanning lines 3a so as to supply image signals to the TFT elements 30.

The pixel electrodes 9 are arranged in a matrix in the optical modulation region 10a of the liquid crystal device 100. Each of the TFTs 30 is provided near the corresponding pixel electrode 9, and serves as a switching element for controlling the supply of current to the pixel electrode 9. A source of the TFT element 30 is electrically connected to the corresponding data line 6a. Image signals S1, S2, Sn are supplied to the data lines 6a. The image signals S1, S2, ..., Sn may be line-sequentially supplied to the data lines 6a in this order, or may be supplied to each block that is defined by a plurality of adjacent data lines 6a (block writing).

A gate of the TFT element 30 is electrically connected to the corresponding scanning line 3a. Scanning signals G1, G2, ..., Gn are supplied to the scanning lines 3a at a predetermined timing and in a pulsed manner. The scanning signals G1, G2, ..., Gm are line-sequentially supplied to the scanning lines 3a in this order. A drain of the TFT element 30 is electrically connected to the corresponding pixel electrode 9. When the TFT elements 30 serving as the switching elements are turned on only for a predetermined period by the scanning signals G1, G2, ..., Gn supplied from the scanning lines 3a, the image signals S1, S2, ..., Sn supplied from the data lines 6a are written in each pixel of the liquid crystal at a predetermined timing.

The image signals S1, S2, ..., Sn of a predetermined level written in the liquid crystal are held for a predetermined period in liquid crystal capacitors provided between the pixel electrodes 9 and a common electrode that will be described below. In order to prevent leakage of the held image signals S1, S2, ..., Sn, storage capacitors 17 are provided between the pixel electrodes 9 and capacitor lines 3b, and are arranged parallel to the liquid crystal capacitors. In this way, when a voltage signal is applied to the liquid crystal, the alignment state of the liquid crystal changes depending on the level of the applied voltage. Consequently, light incident on the liquid crystal is modulated, and gradation display is achieved.

Planar Structure

Figure 3:
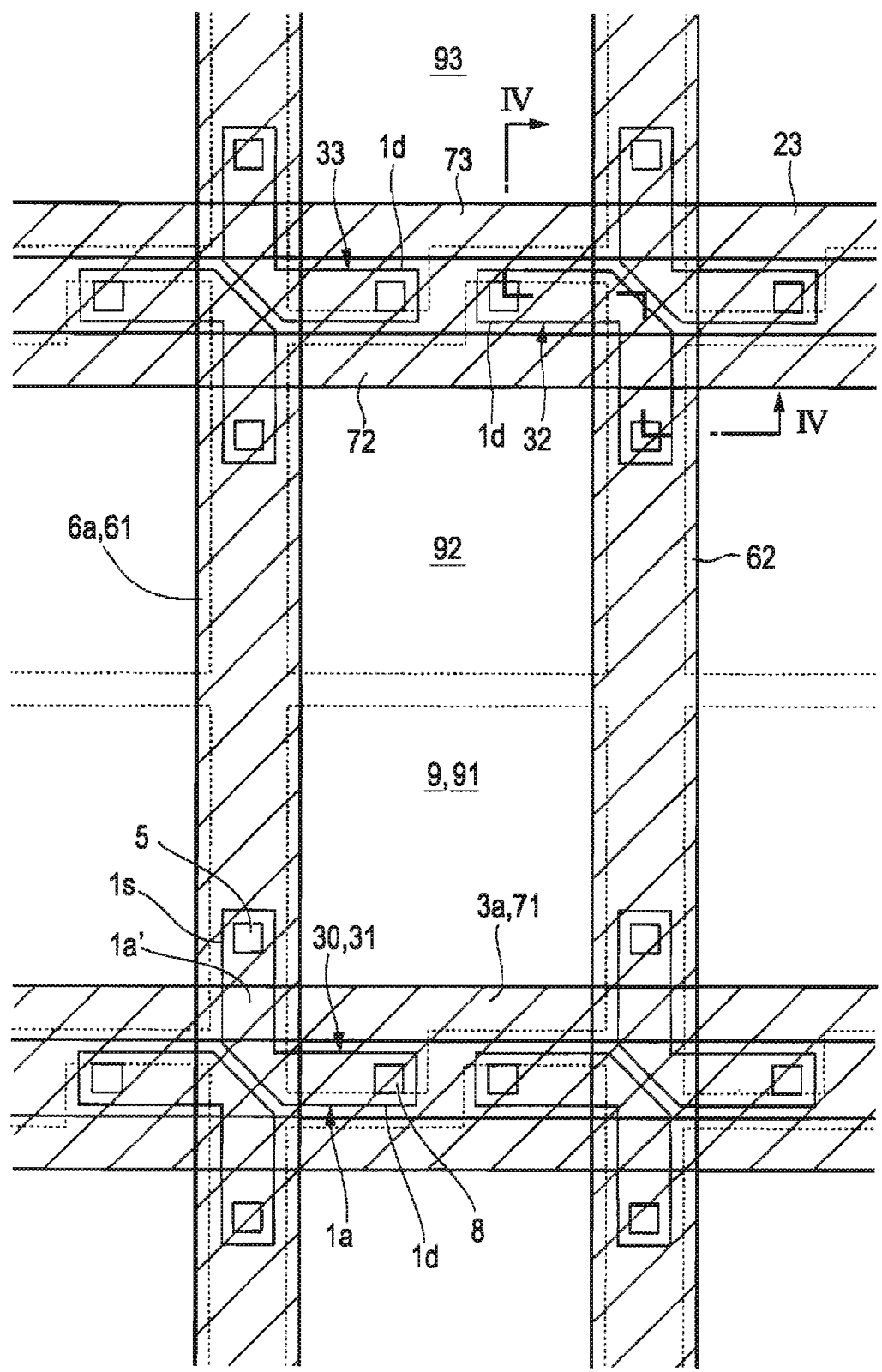
FIG. 3 is an explanatory view showing the planar structure of a liquid crystal device according to a first embodiment of the invention.

FIG. 3 illustrates the planar structure of the optical modulation region 10a in the liquid crystal device 100. In this figure, the capacitor lines 3b and the storage capacitors 17 are not shown.

A plurality of pixel electrodes 9 are arranged in a matrix on the element substrate 10. The pixel electrodes 9 are substantially rectangular, and are made of a transparent conductive material such as indium tin oxide (hereinafter abbreviated as ITO). A region in which each pixel electrode 9 is provided serves as a pixel region, and optical modulation is performed in each pixel region. The data lines 6a and the scanning lines 3a extend around the pixel electrodes 9, and are made of a conductive material such as Al or Cu.

The TFT elements 30 are provided near the intersections of the data lines 6a and the scanning lines 3a. Each of the TFT elements 30 mainly includes a semiconductor layer 1a formed of, for example, a polysilicon film. The semiconductor layer 1a includes a source region 1s and a channel region 1a' overlapping with the data line 6a, and a drain region 1d parallel to the scanning line 3a. The source region 1s is electrically connected to the data line 6a via a contact hole 5. On the other hand, the channel region 1a' is provided in a portion of the semiconductor layer 1a facing the scanning line 3a. A portion of the scanning line 3a facing the channel region 1a' functions as a gate electrode.

Cross-Sectional Structure

Figure 4:
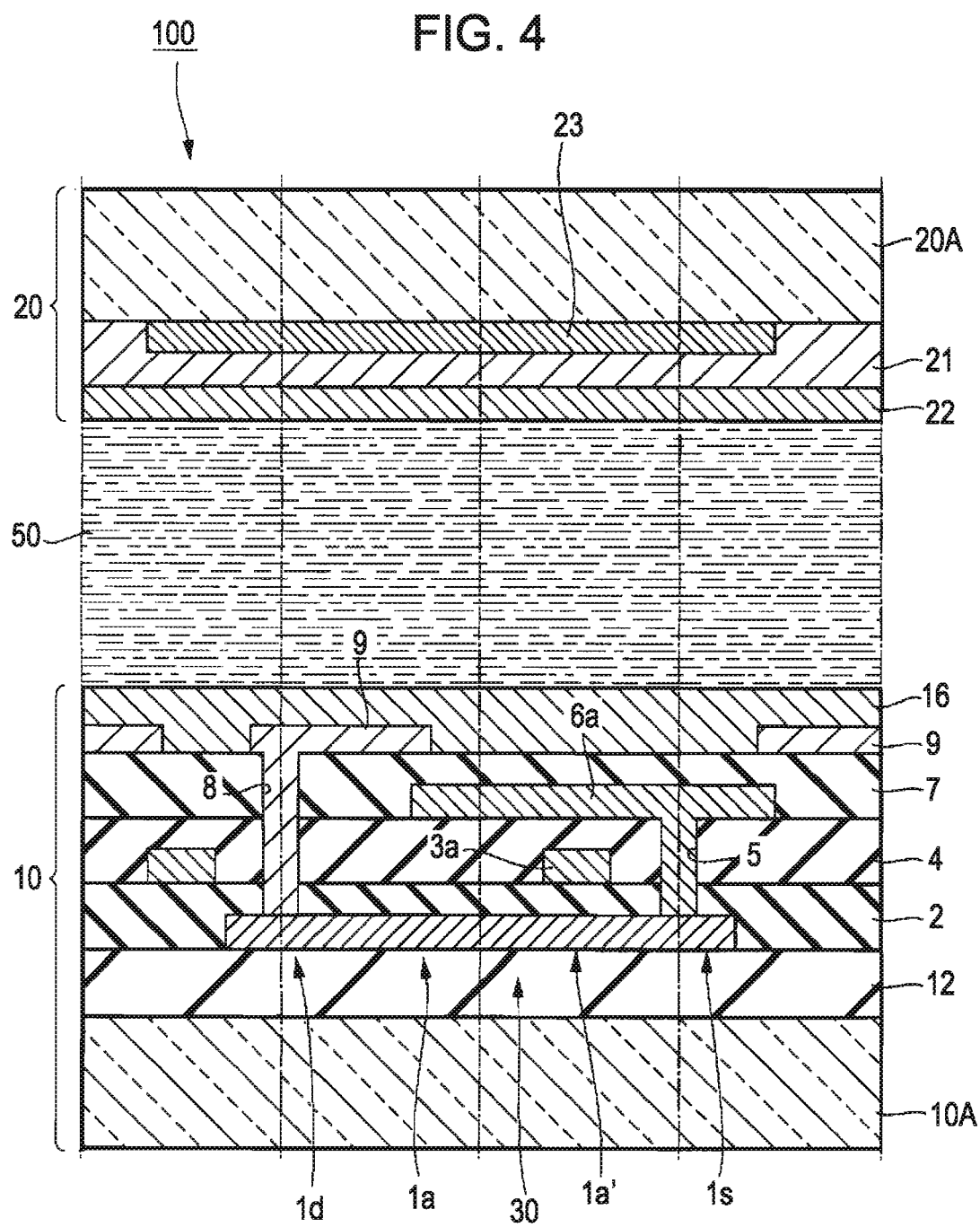
FIG. 4 is an explanatory view showing the cross-sectional structure of the liquid crystal device.

FIG. 4 is a sectional side view taken along line IV-IV in FIG. 3 and showing the cross-sectional structure of the liquid crystal device 100.

As shown in FIG. 4, the element substrate 10 includes a substrate body 10A made of a transmissive material such as glass or quartz. The semiconductor layer 1a is provided on an inner surface of the substrate body 10A with a first interlayer insulating film 12 disposed therebetween. The semiconductor layer 1a is the main part of the TFT element 30. That is, the channel region 1a' is provided in the portion of the semiconductor layer 1a facing the scanning line 3a, and the source region 1s and the drain region 1d are provided on either side of the channel region 1a'. It is preferable that the TFT element 30 have an LDD (lightly doped drain) structure. In this case, a lightly doped source region and a lightly doped drain region (LDD regions) having a relatively low impurity concentration are provided on either side of the channel region 1a', and a heavily doped source region and a heavily doped drain region having a relatively high impurity concentration are provided outside the LDD regions.

A rate insulating film 2 is provided to cover the semiconductor layer 1a. The scanning lines 3a are provided on the gate insulating film 2, and portions thereof function as gate electrodes. A second interlayer insulating film 4 is provided to cover the scanning lines 3a, and the data lines 6a are provided on the second interlayer insulating film 4. Each of the data lines 6a is electrically connected to the source region 1s of the semiconductor layer 1a via the contact hole 5 provided in the second interlayer insulating film 4. A third interlayer insulating film 7 is provided to cover the data lines 6a, and the pixel electrodes 9 are provided thereon. Each of the pixel electrodes 9 is electrically connected to the drain region 1d of the semiconductor layer 1a via a contact hole 8 provided through the second interlayer insulating film 4 and the third interlayer insulating film 7. An alignment film 16, for example, made of polyimide is provided to cover the pixel electrodes 9. For example, a surface of the alignment film 16 is subjected to rubbing so as to regulate the alignment of liquid crystal molecules during the nonselective voltage application time.

On the other hand, the counter substrate 20 includes a substrate body 20A made of a transmissive material such as glass or quartz. A first shielding film 23 is provided on an inner surface of the substrate body 20A. The first shielding film 23 is provided around the pixel electrodes 9 in order to prevent light leakage due to alignment disorder of the liquid crystal. A common electrode 21 formed of a conductor, such as ITO, is provided on almost the entire surface of the first shielding film 23. An alignment film 22 made of, for example, polyimide is provided on the common electrode 21. For example, a surface of the alignment film 22 is subjected to rubbing so as to regulate the alignment of liquid crystal molecules in the nonselective voltage application time.

Liquid crystal 50, such as nematic liquid crystal, is sandwiched between the element substrate 10 and the counter substrate 20. The liquid crystal 50 has a positive dielectric anisotropy, and is oriented substantially parallel to the substrates 10 and 20 during the nonselective voltage application time, and substantially perpendicularly to the substrates 10 and 20 during the selective voltage application time. The liquid crystal 50 also has a positive refractive index anisotropy. The direction of alignment control by the alignment film 16 of the element substrate 10 and the direction of alignment control by the alignment film 22 of the counter substrate 22 cross at approximately 90°, so that the liquid crystal device 100 operates in a TN (twisted nematic) mode. Alternatively, the liquid crystal device 100 may operate in an OCB (optical compensated bend) mode or an ECB (electrically-controlled birefringence) mode.

First Embodiment

Referring again to FIG. 3, a liquid crystal device according to a first embodiment will be described. In this figure, first and second scanning lines 71 and 72 corresponding to first and second pixel electrodes 91 and 92 adjacent in the extending direction of a first data line 61 extend in a manner such that the first and second pixel electrodes 91 and 92 are provided therebetween in the extending direction of the first data line 61. First, second, and third TFT elements 31, 32, and 33 correspond to the first, second, and third pixel electrodes 91, 92, and 93 arranged in the extending direction of the first data line 61, and are alternately connected to either of opposing sides of the first data line 61 and a second data line 62.

Attention will be paid to the pixel electrodes 91 and 92 that are adjacent in the extending direction of the first data line 61. The first scanning line 71 corresponding to the first pixel electrode 91 extends on a side of the first pixel electrode 91 remote from the second pixel electrode 92, and the second scanning line 72 corresponding to the second pixel electrode 92 extends on a side of the second pixel electrode 92 remote from the first pixel electrode 91. Therefore, the first and second pixel electrodes 91 and 92 are adjacent to each other with no scanning line disposed therebetween. The first and second data lines 61 and 62 corresponding to the pixel electrodes 91 and 92 are arranged such that the first and second pixel electrodes 91 and 92 are provided therebetween in the extending direction of the first scanning line 71. As a result, the first and second pixel electrodes 91 and 92 are disposed in a region surrounded by the first and second scanning lines 71 and 72 and the first and second data lines 61 and 62, thus forming an aperture.

The third pixel electrode 93 is provided on the side of the second pixel electrode 92 remote from the first pixel electrode 91. A third scanning line 73 corresponding to the third pixel electrode 93 is adjacent to the above-described second scanning line 72 between the second pixel electrode 92 and the third pixel electrode 93. The above-described first shielding film 23 is disposed in a region where the data lines and the scanning lines are provided, thus forming a non-aperture region.

The first TFT element 31 for controlling the supply of current to the first pixel electrode 91 is provided near the intersection of the first data line 61 and the first scanning line 71. The second TFT element 32 for controlling the supply of current to the second pixel electrode 92 is provided near the intersection of the second data line 62 and the second scanning line 72. Further, the third TFT element 33 for controlling the supply of current to the third pixel electrode 93 is provided near the intersection of the first data line 61 and the third scanning line 73. In this way, the TFT elements 31, 32, and 33 corresponding to the pixel electrodes 91, 92, and 93 arrayed in the extending direction of the first data line 61 are arranged in a staggered manner in the extending direction of the first data line 61 and the second data line 62. That is, the TFT elements 31, 32, and 33 are alternately connected to either of the opposing sides of the adjacent data lines 61 and 62 in the extending direction of the data lines 61 and 62.

A drain region 1$d$ of the second TFT element 32 is provided near the second data line 62 between the second scanning line 72 and the third scanning line 73, and a drain region 1$d$ of the third TFT element 33 is provided near the first data line 61 between the second scanning line 72 and the third scanning line 73.

Figure 5A:
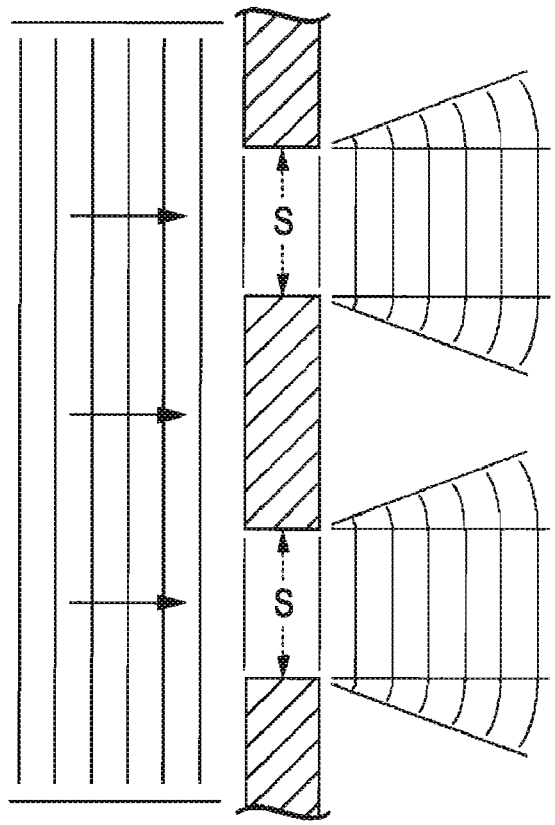
FIGS. 5A and 5B are explanatory views showing diffraction.
Figure 5B:
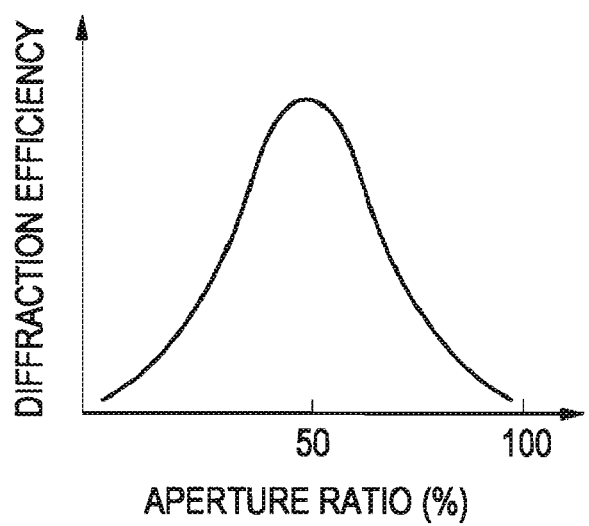

FIG. 5A explains diffraction. Diffraction is a phenomenon in which a wave traveling straight is bent at an end of an obstacle and is directed to the back side of the obstacle. The ratio (diffraction efficiency) of the amount of diffracted light to the amount of light incident on an aperture S decreases as the area of the aperture S increases. As shown in FIG. 5B, the diffraction efficiency is the highest when the ratio (aperture ratio) of the area of the aperture S to the area of the obstacle is 50%. Since the aperture ratio of the liquid crystal device is generally 50% or more, the diffraction efficiency decreases as the aperture ratio increases. That is, as the area (pitch) of the aperture increases and the aperture ratio increases, the diffraction efficiency decreases and the influence of diffraction decreases.

Figure 6:
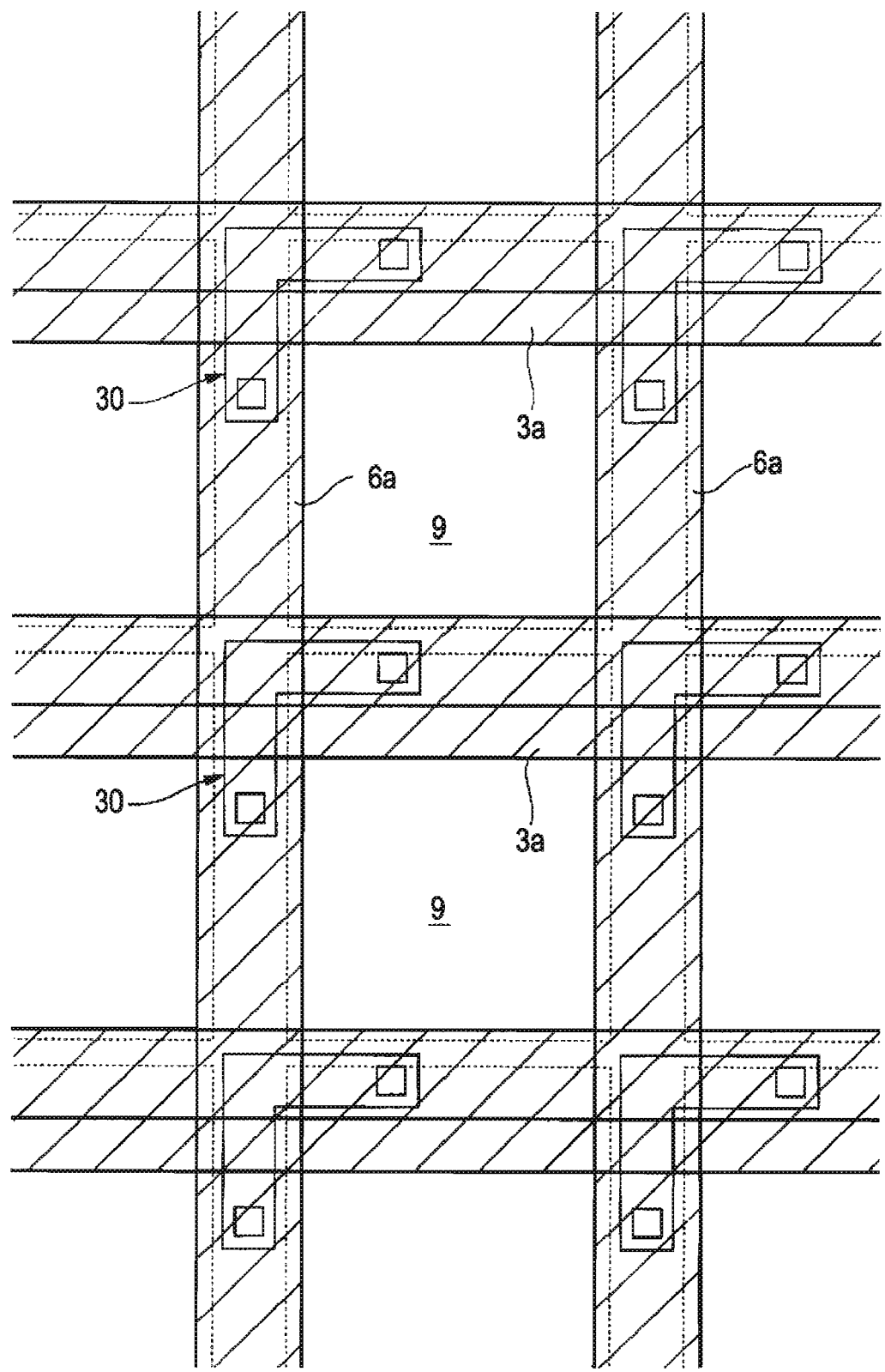
FIG. 6 is an explanatory view showing the planar structure of a known liquid crystal device.

FIG. 6 illustrates the planar structure of a known liquid crystal device. In this liquid crystal device, an aperture is formed by one pixel electrode 9 provided in a region surrounded by data lines 6$a$ and scanning lines 3$a$. In contrast, in the liquid crystal device of the first embodiment shown in FIG. 3, an aperture is formed by a pair of pixel electrodes, and the area of the aperture is increased. Therefore, the influence of diffraction can be reduced.

In the first embodiment, the area of the aperture is increased by the adjacent scanning lines to which ON/OFF signals are supplied from the TFT elements, not by the data lines to which data signals are supplied. This minimizes an electrical interference between the lines.

Figure 7:
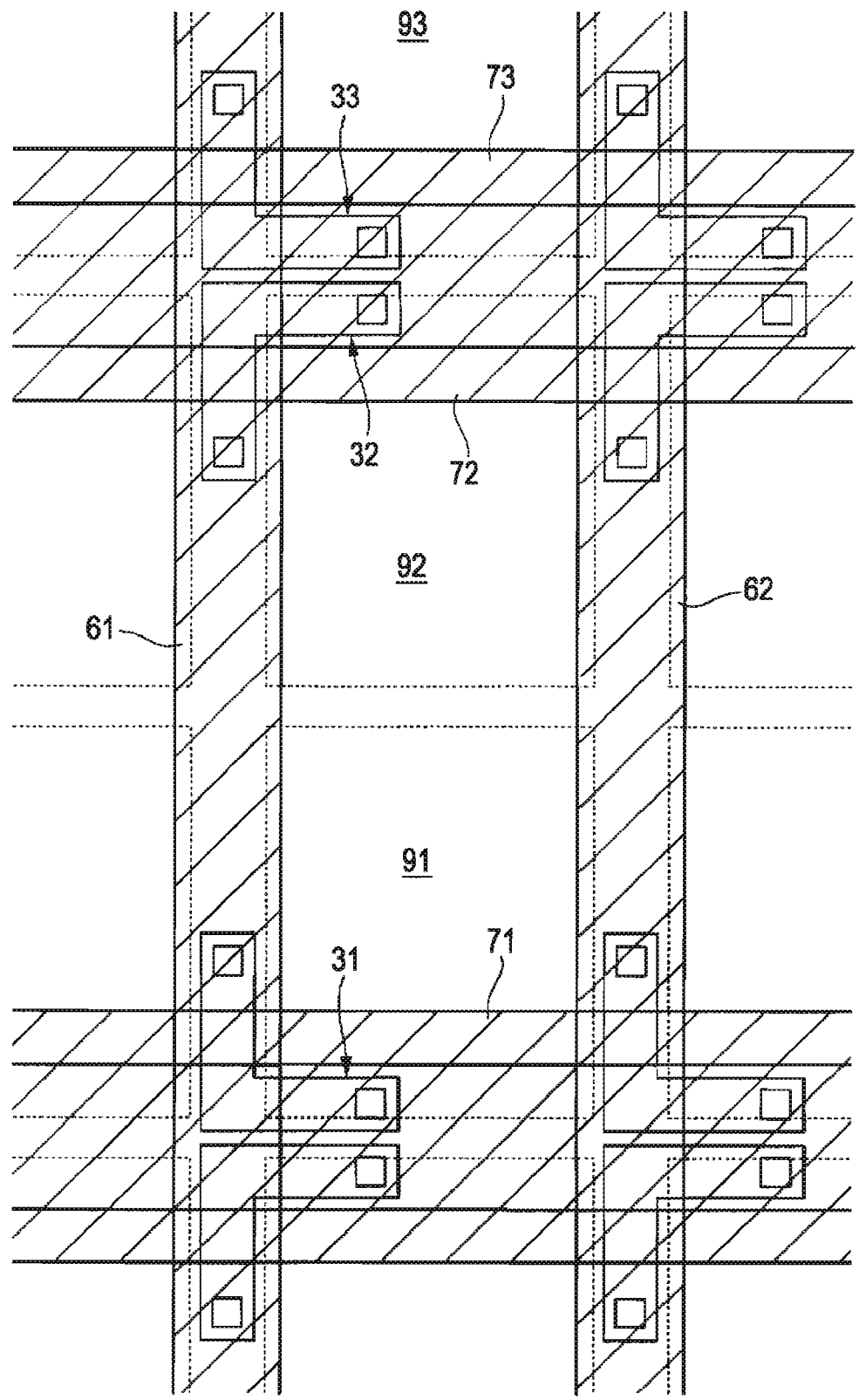
FIG. 7 is an explanatory view showing the planar structure of another known liquid crystal device.

FIG. 7 shows the planar structure of the liquid crystal device disclosed in the above-described publication JP-A-11-95235. In this liquid crystal device, an aperture is formed by two pixel electrodes. However, since the second TFT element 32 for controlling the supply of current to a second pixel electrode 92 is provided near the intersection of a first data line 61 and a second scanning line 72, the first, second, and third TFT elements 31, 32, and 33 are arranged in line in the extending direction of the first data line 61. In this case, the second TFT element 32 and the third TFT element 33 are arranged in series between the adjacent second and third scanning lines 72 and 73. This increases the area of a non-aperture region, and decreases the aperture ratio.

In contrast, in the liquid crystal device of the first embodiment shown in FIG. 3, since the first, second, and third TFT elements 31, 32, and 33 are arranged in a staggered manner in the extending direction of the first data line 61, the second TFT element 32 and the third TFT element 33 can be arranged in parallel between the second scanning line 72 and the third scanning line 73. Consequently, the area of the non-aperture region is reduced, and the aperture ratio is increased.

Figure 8:
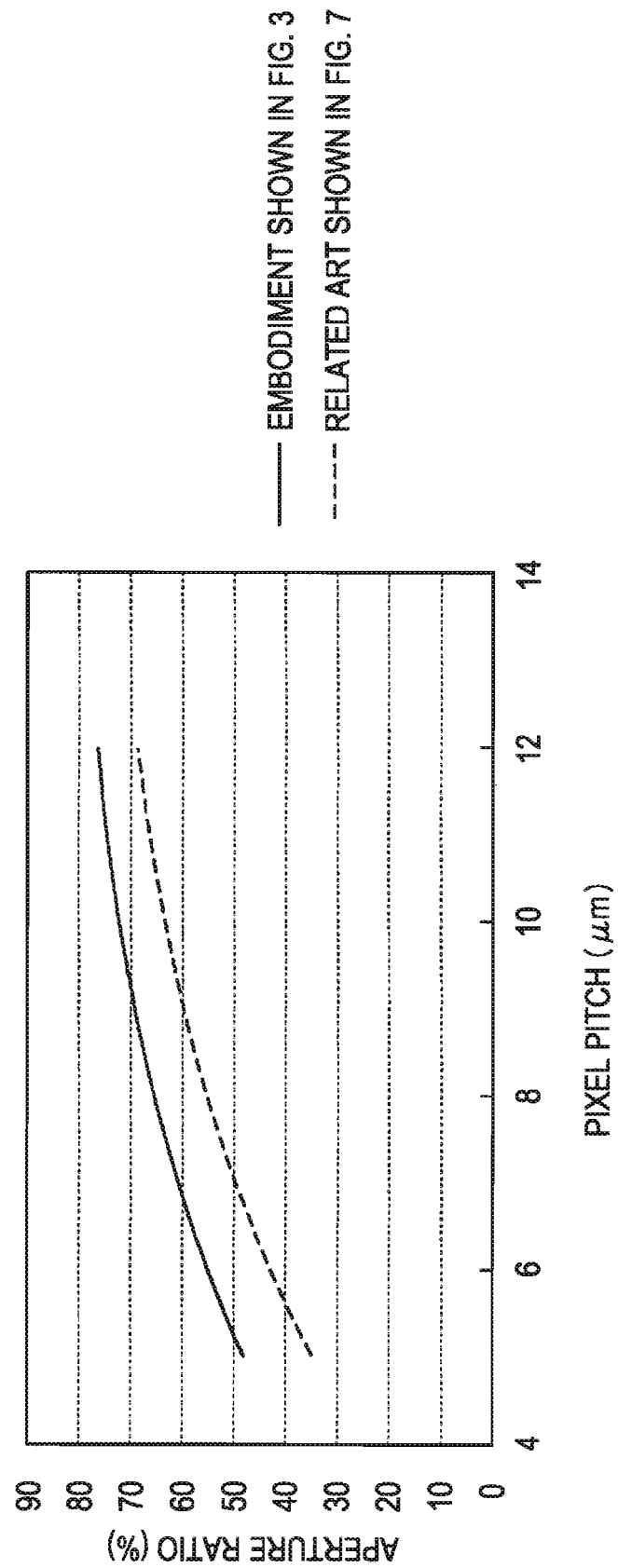
FIG. 8 is a graph showing the comparison of the aperture ratios.

FIG. 8 is a graph showing the comparison between the aperture ratio in the liquid crystal device of the first embodiment shown in FIG. 3 and the aperture ratio in the related art shown in FIG. 7. As shown in FIG. 8, the aperture ratio is higher in the first embodiment than in the related art, regardless of the pixel pitch. Therefore, the liquid crystal device of the first embodiment can reduce the influence of diffraction.

Second Embodiment

A liquid crystal device according to a second embodiment of the invention will now be described.

Figure 9:
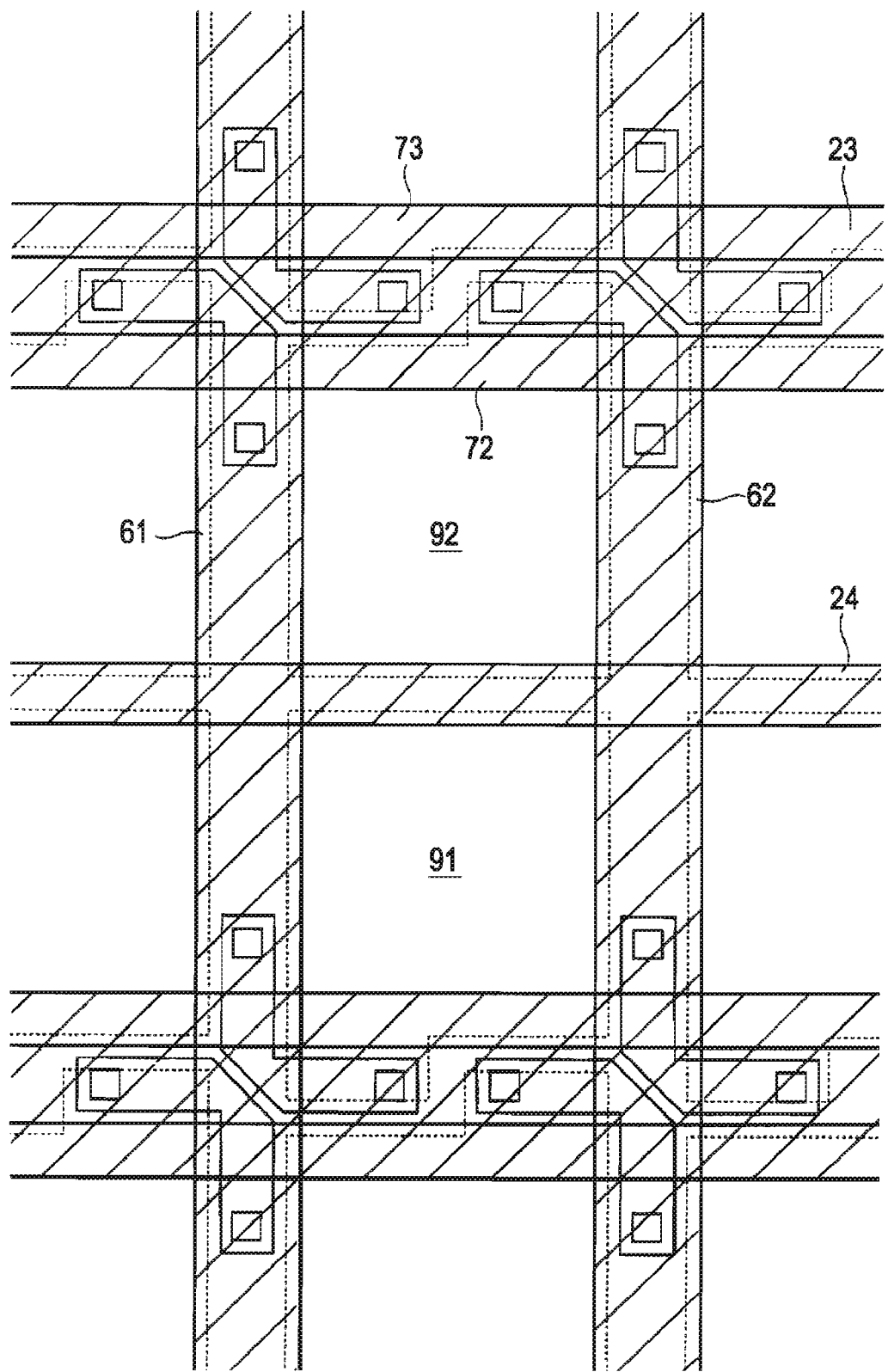
FIG. 9 is an explanatory view showing the planar structure of a liquid crystal device according to a second embodiment of the invention.

FIG. 9 illustrates the planar structure of the liquid crystal device of the second embodiment. The second embodiment is different from the first embodiment in that a second shielding film 24 is provided between a pair of pixel electrodes 91 and 92 so as to cover a no-pixel-electrode region where no pixel electrode is provided. Detailed descriptions of structures similar to those in the first embodiment are omitted.

In the second embodiment, the pixel electrodes 91 and 92 are also arranged adjacent to each other with no scanning line disposed therebetween. However, in the no-pixel-electrode region between the pixel electrodes 91 and 92, the force of controlling the alignment of liquid crystal during the selective voltage application time is weak, and alignment disorder (disclination) occurs. As a result, light leaks from the region, and this may lower the contrast of the display image.

Accordingly, in the second embodiment, the no-pixel-electrode region is covered with the second shielding film 24 in order to prevent leakage therefrom. By placing the second shielding film 24 such as to overlap with the ends of the pixel electrodes 91 and 92, light leakage can be avoided reliably. In this case, it is satisfactory as long as the second shielding film 24 is narrower than a first shielding film 23 that covers adjacent scanning lines 72 and 73, and the aperture ratio does not fall significantly. Conversely, when the second shielding film 24 is provided only in the no-pixel-electrode region outside the pixel electrodes 91 and 92, the fall in aperture ratio can be minimized. The second shielding film 24 can be provided on the counter substrate 20 and integrally with the first shielding film 23 shown in FIG. 4. This reduces the manufacturing cost.

Third Embodiment

A liquid crystal device according to a third embodiment of the invention will now be described.

Figure 10:
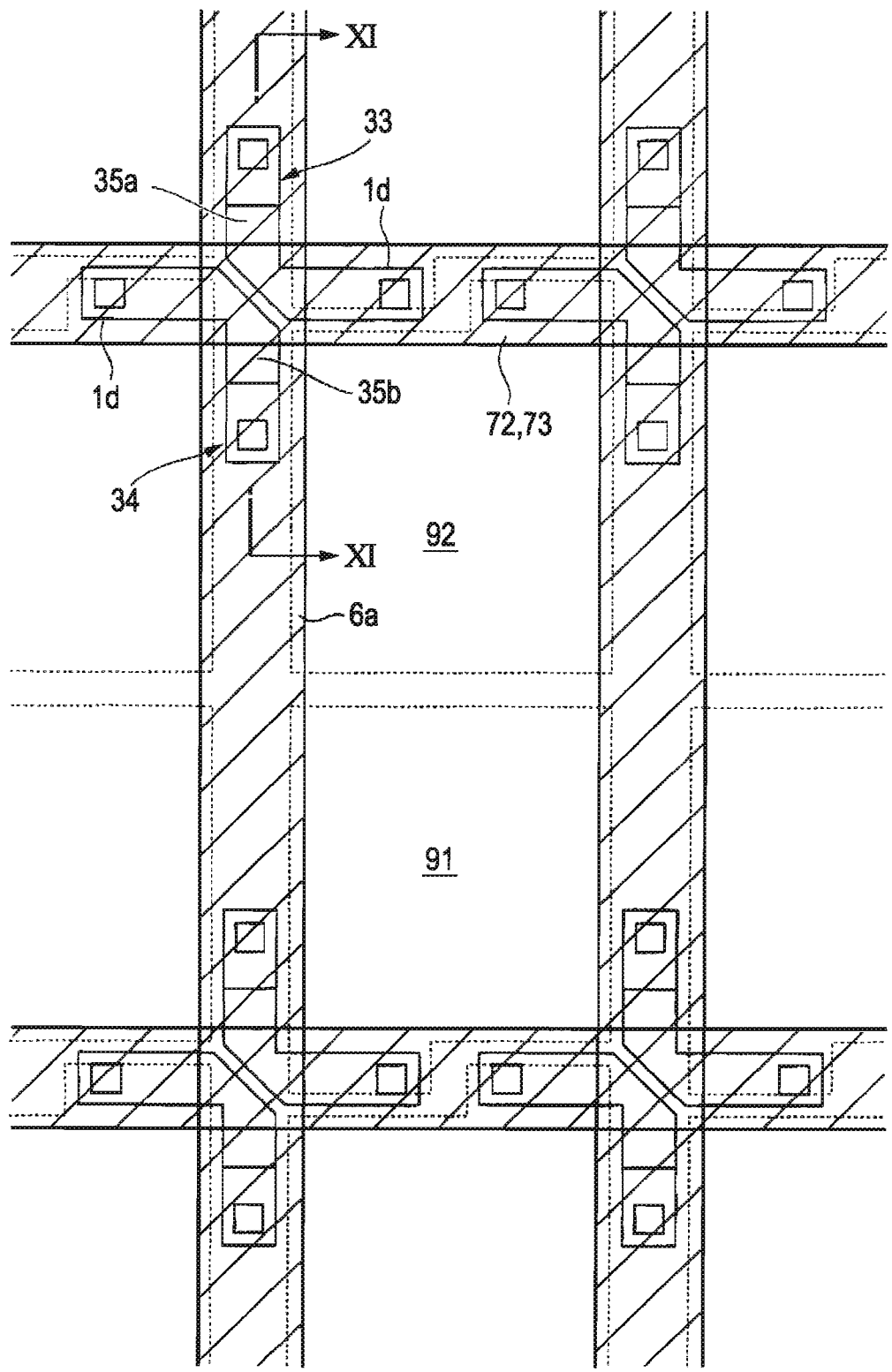
FIG. 10 is an explanatory view showing the planar structure of a liquid crystal device according to a third embodiment of the invention.

FIG. 10 illustrates the planar structure of the liquid crystal device of the third embodiment. In the third embodiment, a second scanning line 72 and a third scanning line 73 are stacked such as to coincide with each other in plan view, unlike the first embodiment in which the scanning lines are arranged on the same plane. Detailed descriptions of structures similar to those in the above-described embodiments are omitted.

Figure 11:
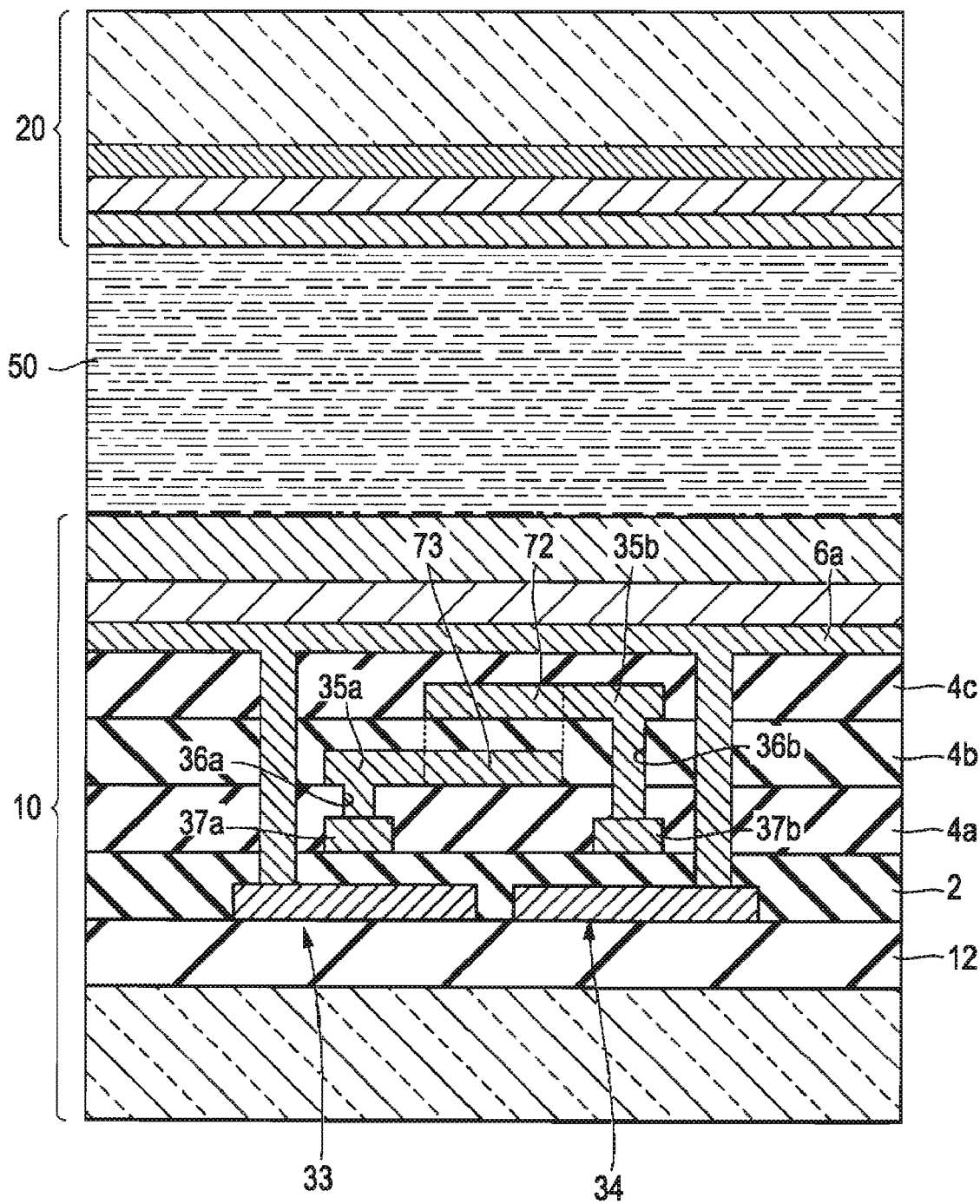
FIG. 11 is an explanatory view showing the cross-sectional structure of the liquid crystal device of the third embodiment.

FIG. 11 is a sectional side view taken along line XI-XI in FIG. 10 and showing cross-sectional structures of a third TFT element 33 and a fourth TFT element 34. A third gate electrode 37a and a fourth gate electrode 37b are provided on a gate insulating film 2. The third and fourth gate electrodes 37a and 37b are covered with an interlayer insulating film 4a, and the third scanning line 73 is provided on the interlayer insulating film 4a. A relay electrode 35a branches off from the third scanning line 73, and is connected to the third gate electrode 37a via a contact hole 36a provided in the interlayer insulating film 4a. The third scanning line 73 and the relay electrode 35a are covered with an interlayer insulating film 4b, and the second scanning line 72 is provided on the interlayer insulating film 4b. A relay electrode 35b branches off from the second scanning line 72, and is connected to the fourth gate electrode 37b via a contact hole 36b provided through the interlayer insulating films 4a and 4b. With the above-described structure, the third scanning line 73 and the second scanning line 72 can be connected to the third TFT element 33 and the fourth TFT element 34 while being stacked such as to coincide with each other in plan view.

As shown in FIG. 10, the third scanning line 73 and the second scanning line 72 can be disposed above drain regions 1d of the third TFT element 33 and the fourth TFT element 34. This markedly reduces the area of the non-aperture region, and increases the aperture ratio. Therefore, the influence of diffraction can be reduced.

Projector

Figure 12:
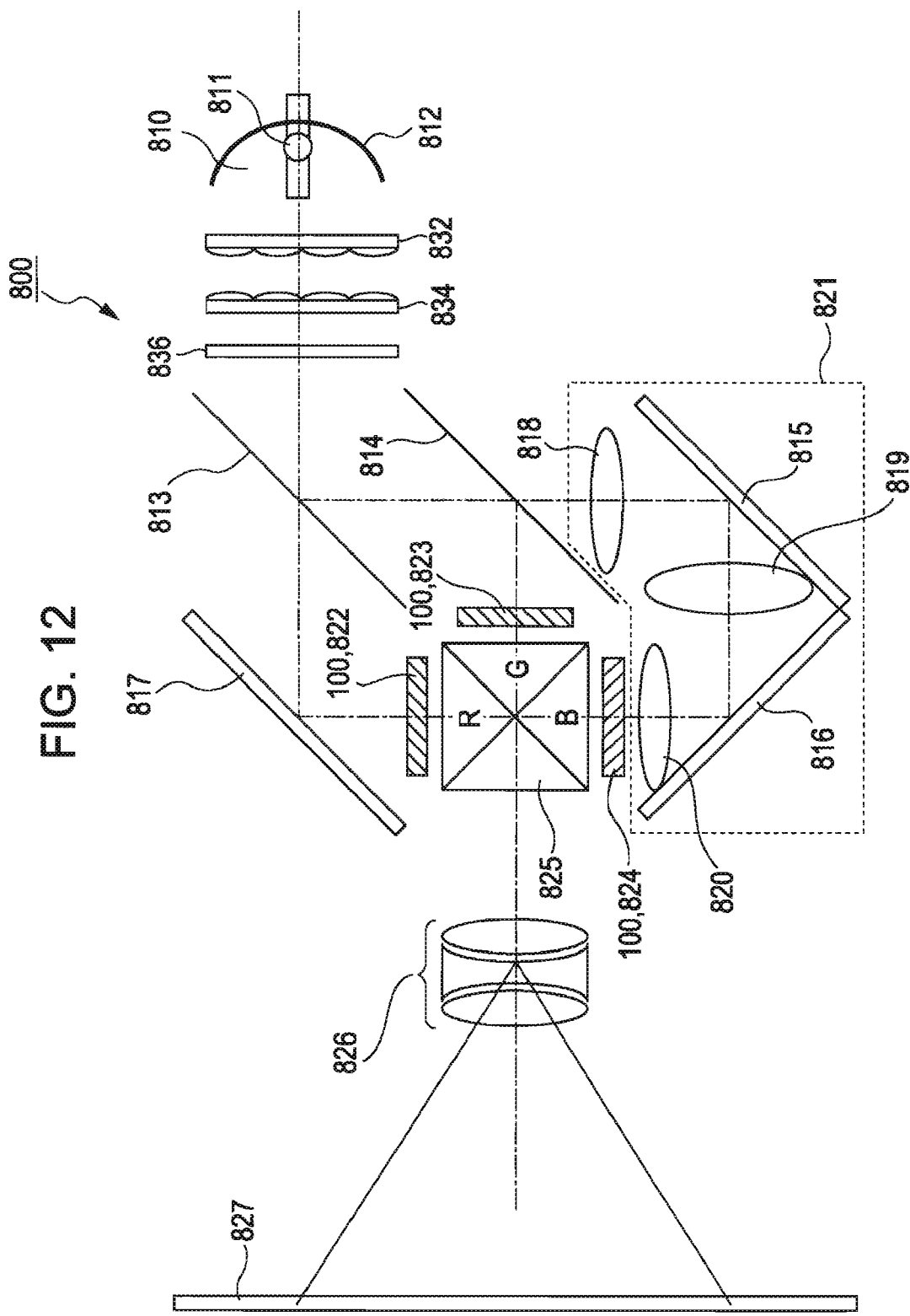
FIG. 12 is a schematic structural view of a projector.

A description will now be given of a projector 800 that performs optical modulation with the liquid crystal device according to any of the above-described embodiments. FIG. 12 schematically shows the configuration of the projector 800.

In the projector 800, a light source 810 includes a light source lamp 811, such as a halogen lamp, a metal halide lamp, or a high-pressure mercury lamp, and a concave mirror 812 that receives radiant light from the light source lamp 811 and that emits the radiant light as a substantially parallel light beam. A first lens array 832 and a second lens array 834 are provided downstream of the light source 810. Each of the first and second lens arrays 832 and 834 includes substantially rectangular microlenses arranged in a matrix. The first lens array 832 splits the parallel light beam incident from the light source 810 into a plurality of partial beams, and focuses the partial light beams near the second lens array 834. The second lens array 834 has a function of correcting the partial light beams incident from the first lens array 834 so that the center axes thereof become perpendicular to corresponding light modulators 822, 823, and 824. A polarized-light converter 836 provided downstream of the second lens array 834 converts the incident partial light beams into one type of linearly polarized light (e.g., s-polarized light or p-polarized light), and emits the polarized light.

The light exiting from the polarized-light converter 836 enters a dichroic mirror 813. The dichroic mirror 813 reflects a green light component and a blue light component included in the white light from the light source lamp 811, and transmits a red light component of the white light. The red light component passing through the dichroic mirror 813 is reflected by a reflecting mirror 817, and enters a red-light modulator 822. In contrast, the green and blue light components reflected by the dichroic mirror 813 enter a dichroic mirror 814. The dichroic mirror 814 transmits the blue light component, and reflects the green light component. The green light component reflected by the dichroic mirror 814 enters a green-light modulator 823. The blue light component passing through the dichroic mirror 814 enters a blue-light modulator 824 via a light guide means 821. The light guide means 821 is formed by a relay lens system including an incident lens 818, a relay lens 819, and an emission lens 820, and prevents the blue light component from being lost because of the long optical path.

A liquid crystal light valve is adopted as each of the light modulators 822, 823, and 824, and includes the liquid crystal device 100 according to any of the above-described embodiments, and a polarizer and a retardation plate between the liquid crystal device 100 is held. The each light component is modulated by the liquid crystal light valve, and a corresponding color image light component is produced.

The color image light components exiting from the light modulators 822, 823, and 824 enter a crossed dichroic prism 825. The crossed dichroic prism 825 is formed by bonding four rectangular prisms, and a dielectric multilayer film for reflecting the red light component and a dielectric multilayer film for reflecting the blue light component are arranged in an X-form along interfaces between the prisms. The color image light components are combined by these dielectric multilayer films, thereby producing color image light. The produced color image light is enlarged and projected onto a screen 827 by a projection lens 826 serving as a projection optical system. Consequently, a color image is displayed on the screen 827.

Since the influence of diffraction can be reduced by using the liquid crystal device of the embodiment, most of the color image light exiting from the crossed dichroic prism 825 can enter the projection lens 826. As a result, it is possible to display a bright color image on the screen 827, and to improve the display quality of the projector.

Figures 13A, 13B:
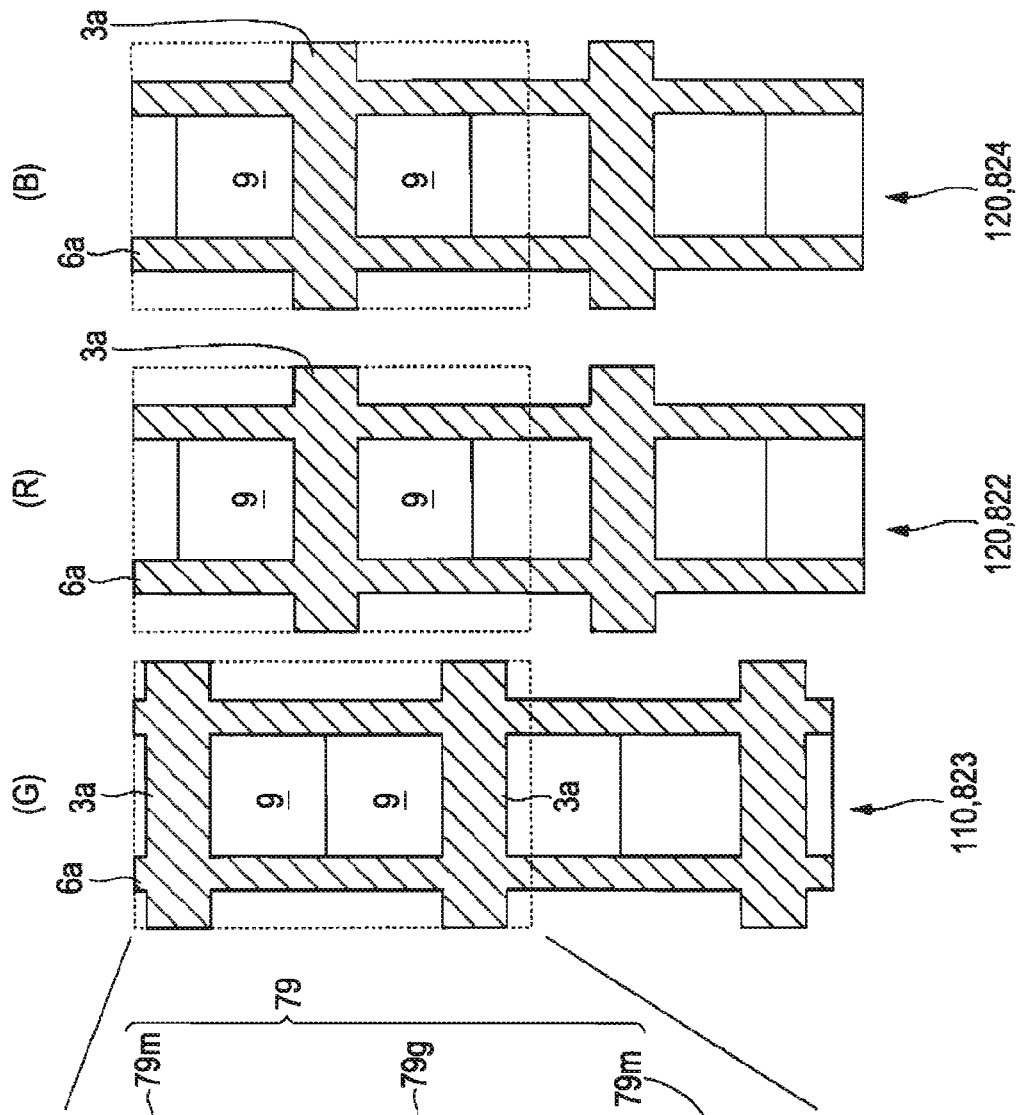
FIGS. 13A and 13B are layout views of lines that constitute a liquid crystal device serving as a light modulator.

FIG. 13B shows the layout of the scanning lines in the liquid crystal device that constitutes the light modulator. In this embodiment, a scanning line 3a in a first liquid crystal device 110 that modulates first color light and a scanning line 3a in a second liquid crystal device 120 that modulates second color light are shifted from each other in the extending direction of a data line 6a by a distance almost equal to the length of a pixel electrode 9 in the extending direction of the data line 6a.

FIG. 13A explains a display image formed by the projector having the above-described configuration. A first shielded portion 79m is formed on the display image by each scanning line 3a in the first liquid crystal device 110, and a second shielded portion 79g is formed on the display image by each scanning line 3a in the second liquid crystal device 120. The first shielded portion 79m and the second shielded portion 79g are vertically shifted from each other by a distance corresponding to one pixel 99. This allows the shielded portions 69 and 79 to be arranged around each pixel 99 on the display image. As a result, normal image display (particularly, text display) is achieved.

It should be noted that the shielded portions 79 cannot be completely shielded because the second color light is projected from the second liquid crystal device 120 onto the first shielded portions 79m and the first color light is projected from the first liquid crystal device 110 onto the second shielded portions 79g.

Accordingly, it is preferable that the first liquid crystal device 110 be assigned to the green-light modulator 823 and that the second liquid crystal device 120 be assigned to the red-light modulator 822 and the blue-light modulator 824, as shown in FIG. 13B. In this case, the first shielded portion 79m shown in FIG. 13A is displayed in magenta, and the second shielded portion 79g is displayed in green. Consequently, the first shielded portion 79a and the second shielded portion 79g can have the same brightness, and normal image display is achieved.

Fourth Embodiment

A liquid crystal device according to a fourth embodiment of the invention will now be described.

Figure 14:
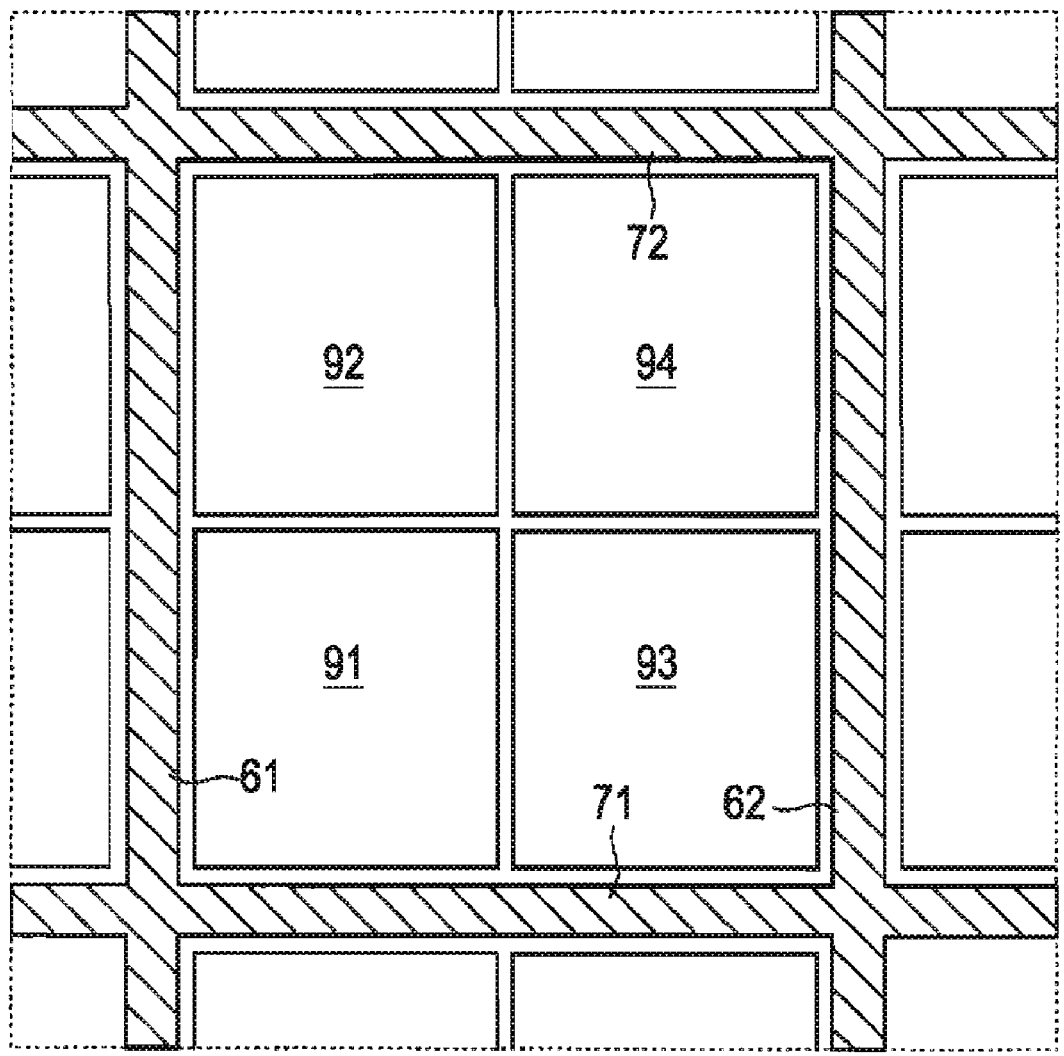
FIG. 14 is an explanatory view showing the planar structure of a liquid crystal device according to a fourth embodiment of the invention.

FIG. 14 illustrates the planar structure of the liquid crystal device of the fourth embodiment. In this liquid crystal device, first and second scanning lines 71 and 72 corresponding to first and second pixel electrodes 91 and 92 adjacent in the extending direction of a first data line 61 are arranged such that the first and second pixel electrodes 91 and 92 are provided therebetween in the extending direction of the first data line 61, and the first data line 61 and a second data line 62 corresponding to the first pixel electrode 91 and a third pixel electrode 93 adjacent in the extending direction of the first scanning line 71 are arranged such the first and third pixel electrodes 91 and 93 are provided therebetween in the extending direction of the first scanning line 71. Detailed descriptions of components similar to those in the above-described embodiments are omitted.

Attention will be paid to the first and second pixel electrodes 91 and 92 adjacent in the extending direction of the first data line 61. In the fourth embodiment, the first scanning line 71 corresponding to the first pixel electrode 91 is disposed on a side of the first pixel electrode 91 remote from the second pixel electrode 92, and the second scanning line 72 corresponding to the second pixel electrode 92 is disposed on a side of the second pixel electrode 92 remote from the first pixel electrode 91. Therefore, the first and second pixel electrodes 91 and 92 are adjacent to each other without any scanning line disposed therebetween. The third pixel electrode 93 and a fourth pixel electrode 94 adjacent in the extending direction of the second data line 62 are arranged similarly.

Next, attention will now be paid to the first and third pixel electrodes 91 and 93 adjacent in the extending direction of the first scanning line 71. The first data line 61 corresponding to the first pixel electrode 91 is disposed on a side of the first pixel electrode 91 remote from the third pixel electrode 93, and the second data line 62 corresponding to the third pixel electrode 93 is disposed on a side of the third pixel electrode 93 remote from the first pixel electrode 91. Therefore, the first and third pixel electrodes 91 and 93 are adjacent to each other without any data line disposed therebetween. The second and fourth pixel electrodes 92 and 94 adjacent in the extending direction of the second scanning line 72 are arranged similarly.

In the above-described structure, the four pixel electrodes 91, 92, 93, and 94 are arranged in a region surrounded by the scanning lines 71 and 72 and the data lines 61 and 62. Another scanning line is adjacent to a side of the first scanning line 71 remote from the pixel electrodes, and another scanning line is adjacent to a side of the second scanning line 72 remote from the pixel electrodes. Another data line is adjacent to a side of the first data line 61 remote from the pixel electrodes, and another data line is adjacent to a side of the second data line 62 remote from the pixel electrodes. A region where the scanning lines and the data lines are provided serves as a non-aperture region, and a region surrounded by the scanning lines and the data lines serves as an aperture. Since the aperture is defined by the four pixel electrodes 91, 92, 93, and 94 in the fourth embodiment, the area of the aperture is large. Therefore, the influence of diffraction can be reduced.

Image signals S1, S2, . . . , Sn may be supplied to each block defined by a plurality of data lines 6a (block writing), as described above with reference to FIG. 2 serving as the equivalent circuit diagram. Accordingly, in the fourth embodiment, an image-signal driving circuit and various lines are constructed so that a plurality of adjacent data lines are provided in the same block, and image signals are substantially simultaneously supplied to the adjacent data lines. When an image signal is supplied to only one of two adjacent data lines, an electrical interference occurs between the data lines. This phenomenon is remarkable particularly between the data lines, to which image signals are supplied, than between the scanning lines to which ON/OFF signals of the TFT elements are supplied. Since image signals are substantially simultaneously supplied to a plurality of adjacent data lines in the fourth embodiment, an electrical interference between the data lines can be prevented.

A description will now be given of a projector that performs optical modulation with the liquid crystal device of the fourth embodiment. Each of the light modulators 822, 823, and 824 in the projector 800 shown in FIG. 12 is replaced with a liquid crystal light valve including the liquid crystal device 100 of the fourth embodiment, and a polarizer and a retardation plate between which the liquid crystal device 100 is held. Each color light is modulated by the liquid crystal light valve, and corresponding color image light is produced.

Figure 15A:
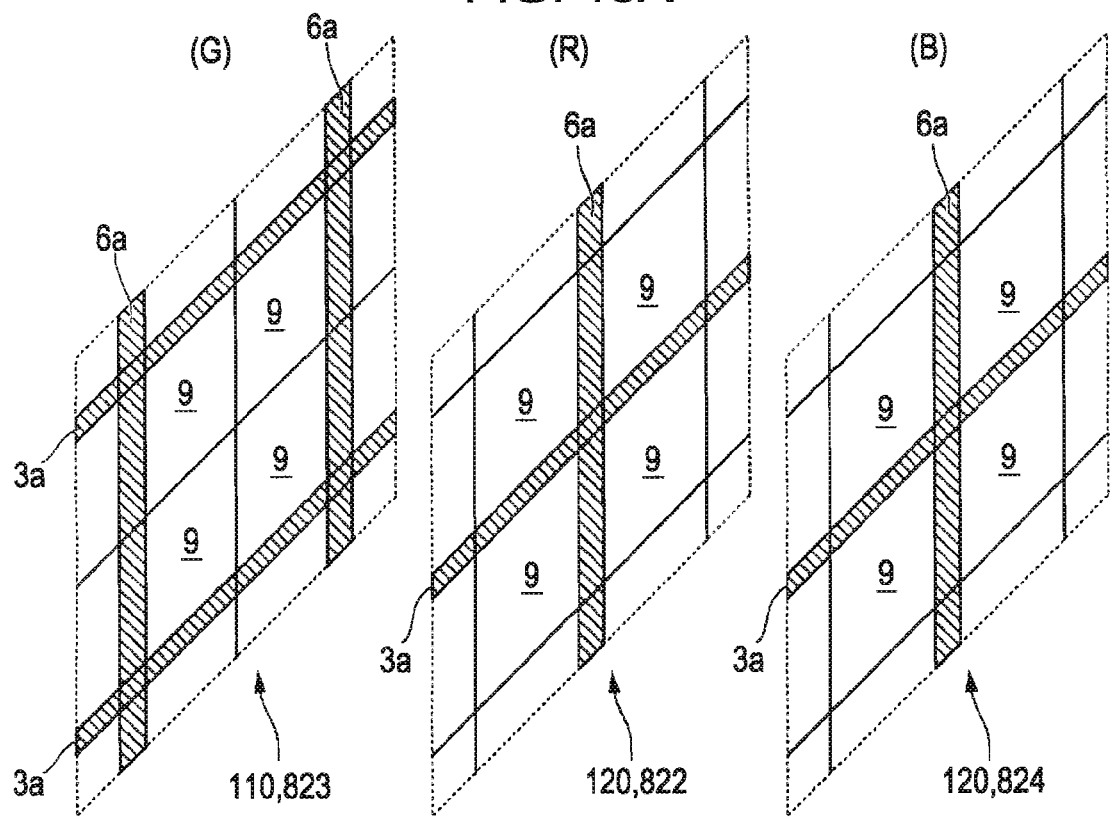
FIGS. 15A and 15B are layout views of lines that constitute a liquid crystal device serving as a light modulator.

FIG. 15A shows the layout of scanning lines 3a and data lines 6a in the liquid crystal device 100 serving as the light modulator. In the fourth embodiment, each scanning line 3a in a first liquid crystal device 110 that modulates first color light is shifted from each scanning line 3a in a second liquid crystal device 120 that modulates second color light in the extending direction of each data line 6a by a distance almost equal to the length of one pixel electrode 9 in the extending direction of the data line 6a. Each data line 6a in the first liquid crystal device 110 is shifted from each data line 6a in the second liquid crystal device 120 in the extending direction of the scanning line 3a by a distance almost equal to the length of one pixel electrode 9 in the extending direction of the scanning line 3a.

Figure 15B:
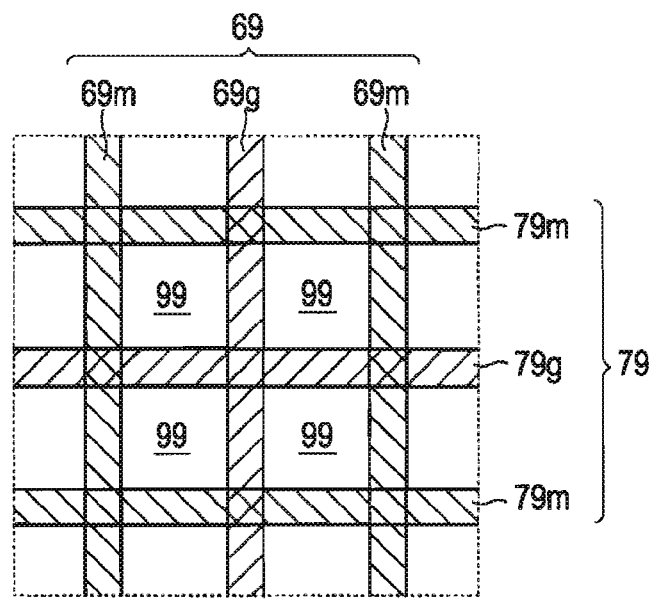

FIG. 15B explains a display image formed by the projector having the above-described configuration. First shielded portions 69m and 79m are formed on the display image by non-aperture regions in the first liquid crystal device 110, and second shielded portions 69g and 79g are formed on the display image by non-aperture regions in the second liquid crystal device 120. The first shielded portions 69m and 79m and the second shielded portions 69g and 79g are vertically and horizontally shifted from each other by a distance corresponding to one pixel 99. This allows the first and second shielded portions 69 and 79 to be arranged around each pixel 99 on the display image. As a result, normal image display (particularly text display) is achieved.

It should be noted that the shielded portions 69 and 79 cannot be completely shielded because the second color light is projected from the second liquid crystal device 120 onto the first shielded portions 69m and 79m and the first color light is projected from the first liquid crystal device 110 onto the second shielded portions 69g and 79g.

Accordingly, it is preferable that the first liquid crystal device 110 be assigned to the green-light modulator 823 and that the second liquid crystal device 120 be assigned to the red-light modulator 822 and the blue-light modulator 824, as shown in FIG. 15A. In this case, the first shielded portions 69m and 79m shown in FIG. 15B are displayed in magenta, and the second shielded portions 69g and 79g are displayed in green. Consequently, the first shielded portions 69m and 79m and the second shielded portions 69g and 79g can have the same brightness, and normal image display is achieved.

The technical scope of the invention is not limited to the above-described embodiments, and includes various modifications of the embodiments without departing from the purport of the invention. That is, the specific materials and structures given in the embodiments are just exemplary, and may be altered appropriately.

What is claimed is:

1. A liquid crystal device comprising:
a pair of substrates between which liquid crystal is sandwiched;
a plurality of pixel electrodes arranged in a matrix on one of the substrates;
switching elements that control a supply of current to the pixel electrodes;
scanning lines that supply scanning signals to the switching elements; and
data lines that cross the scanning lines and that supply image signals to the switching elements, wherein
the pixel electrodes are arranged in pairs, each pair of the pixel electrodes being adjacent in an extending direction of the data lines and being disposed between a corresponding pair of the scanning lines in the extending direction of the data lines;
the scanning lines include a plurality of scanning lines that are stacked such as to coincide with each other in plan view; and
the pixel electrodes are arranged in first pairs and second pairs, each first pair of the pixel electrodes being adjacent in an extending direction of the data lines and being disposed between a corresponding pair of the scanning lines in the extending direction of the data lines, and each second pair of the pixel electrodes being adjacent in an extending direction of the scanning lines and being disposed between a corresponding pair of the data lines in the extending direction of the scanning lines.

2. A projector that performs light modulation with the liquid crystal device according to claim 1.

* * * * *

UNITED STATES PATENT AND TRADEMARK OFFICE
CERTIFICATE OF CORRECTION

PATENT NO.      : 7,646,462 B2                          Page 1 of 1
APPLICATION NO. : 11/532792
DATED           : January 12, 2010
INVENTOR(S)     : Hidehito Iisaka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 428 days.

Signed and Sealed this

Twenty-eighth Day of December, 2010

David J. Kappos
*Director of the United States Patent and Trademark Office*